INVENTORS.
Patrick L. May and
John R. Majkrzak

United States Patent Office 3,326,394
Patented June 20, 1967

3,326,394
HITCH MECHANISM FOR BALE THROWER
Patrick L. May and John R. Majkrzak, Memphis, Tenn., assignors to International Harvester Company, Chicago, Ill., a corporation of Delaware
Original application Mar. 27, 1961, Ser. No. 98,538. Divided and this application Nov. 8, 1961, Ser. No. 160,383
3 Claims. (Cl. 214—42)

This invention relates to a new and improved bale thrower. This application is a division of applicant's previous application for Bale Thrower, filed Mar. 27, 1961, having Ser. No. 98,538, now Patent No. 3,132,736.

The need for transporting a completed bale of hay to a temporary depositary such as a trailing wagon has long existed. Many conveyors have been employed intermediate a field traversing hay baler and its trailing wagon to deliver completed bales from the bale former to the trailing wagon. Some of these conveyors have required substantial structure to effect this transportation of bales while others, such as the device shown in a copending application of one of the joint inventors of this application Ser. No. 69,883, entitled Bale Discharge Device for Balers, eliminates substantial structure and yet performs the desired function of delivering a completed bale to a trailing wagon.

It is a principal object of the present invention to provide a bale thrower for attachment to hay balers whereby completel bales of hay may be thrown from the baler to a trailing wagon.

Still another important object of this invention is to equip a bale thrower attachment for hay balers with a mechanism adapted for normally directing the thrown bale toward a trailing wagon regardless of the angular relationship of the wagon tongue with the hitch on the hay baler.

Still another and further important object of this invention is to provide a relief mechanism for associated linkage joining a baler with a trailing wagon tongue whereby on excessively sharp turns the joining mechanism may swing free of the wagon tongue to avoid damage to any of the operating elements.

Another and further important object of this invention is the provision of a double hinged arrangement for the coupling association of a trailing wagon to a baler and the intermediately disposed connection of a pivoted bale thrower on the hay baler whereby during normal turning of the baler wherein there is relative angular movement between the trailing wagon and the hay baler, the bale thrower will be directed at the wagon box regardless of the position or side on which the wagon has moved, whereas when unusually sharp turns of the hay baler are made there is built in a yieldable mechanism whereby the coupling may break open and avoid damage to any of the relatively swinging parts.

Other and further important objects and advantages will become apparent from the disclosures in the following specification and accompanying drawings.

In the drawings:

FIG. 3 is a bottom view of the steering arm arrangement employed in this device. FIG. 3 is further identified as a view taken on the line 3—3 of FIG. 2.

Figure 1:
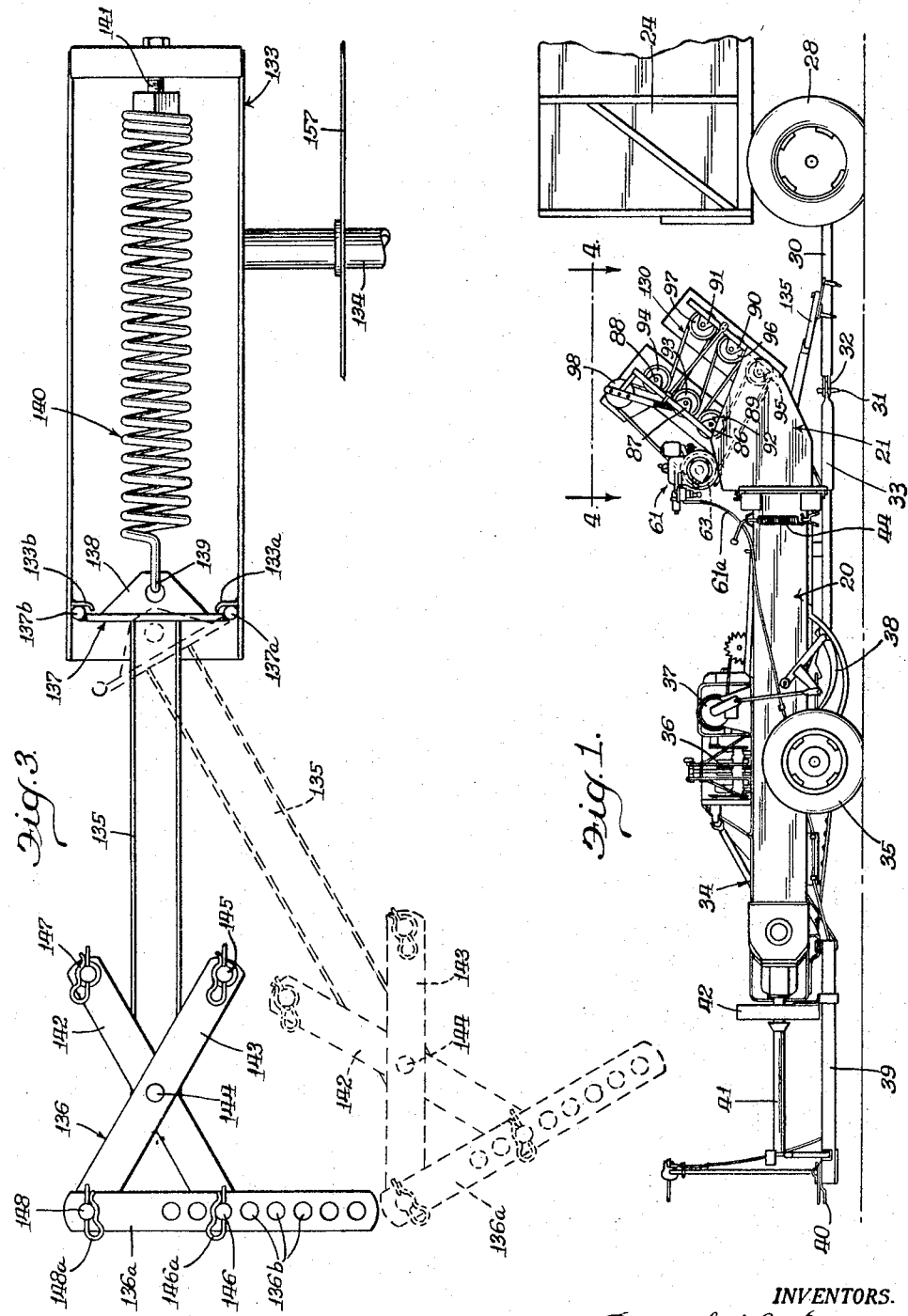
FIGURE 1 is a side elevation view of the entire baler, thrower and trailing wagon combination.

As shown in the drawings, the reference numeral 20 indicates generally a bale forming chamber terminating in aligned engagement with a bale thrower 21 of this invention. The wagon box 24 is carried on rear wheels and on forwardly disposed angularly positionable wheels 28 which are joined by a cross member having a forwardly disposed swingable tongue 30. The tongue is joined by means of a pin 31 and intermediate clevis 32 to a rearwardly projecting hitch 33 on the baler.

Attention is now directed to FIG. 1 of the drawings wherein the entire hay baler designated by the numeral 34 is shown. The baler includes a wheel support 35, a longitudinally extending bale forming chamber 20, packer fingers 36 to feed hay to be baled to the forming chamber, and knotter mechanisms 37 having cooperating therewith strand-carrying and bale-encircling needles 38. The forward end of the baler 34 is equipped with a forwardly projecting tongue or the like 39 which has a clevis 40 on the forward end thereof to provide for attachment of the baler to a pulling tractor. The baler as shown in this drawing is of the power take-off type and utilizes rotational drive from the pulling tractor to deliver rotation through the tube 41 and thence to a large inertia flywheel 42. The flywheel, in turn, imparts reciprocal drive to a plunger (not shown) which operates within the longitudinally extending bale forming chamber in a manner to compress hay into bale formation. A bale chamber tension means 44 is provided adjacent the rear discharge end of the forming chamber 20 just prior to admission of the formed bales to the bale thrower of this invention. The thrower designated generally by the numeral 21 is arranged and constructed to receive the formed bales as they are made by the baler 34 and impel them upwardly and rearwardly into the trailing wagon 24.

The bale thrower 21 is similar to the thrower shown in the copending application Ser. No. 69,883, of Patrick L. May, one of the joint inventors of this invention. The previous application includes a plurality of rollers which are driven at relatively high speeds to frictionally engage the bale and cause it to be thrown upwardly and rearwardly for deposit into a trailing wagon.

Figure 2:
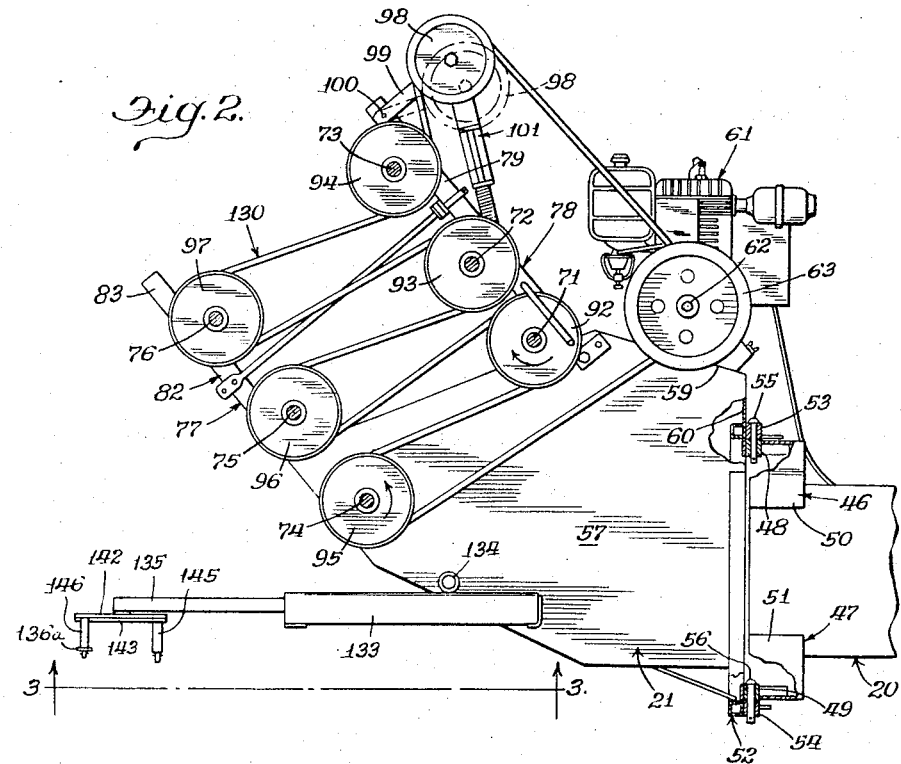
FIG. 2 is a side elevational view showing the serpentine arrangement of a belt to effect a driving of the plurality of bale engaging rollers.

Attention is now directed to FIG. 2 wherein the bale forming chamber 20 is provided with bracket members 46 and 47. The bracket 46 is arranged and constructed to carry a vertically disposed sleeve or socket member 48, whereas the bracket 47 carries a similar sleeve or socket member 49. The brackets 46 and 47 are substantially U-shaped. The bracket 46 forms an inverted U with the side legs 50 fastened to the side of the bale forming chamber 20. Similarly, the bracket 47 forms an upright U and has its side legs 51 attached to the side walls of the forming chamber 20. The sockets 48 and 49 are positioned substantially at the centers of the U-shaped brackets 46 and 47 and are in vertical axial alignment with one another. The bale thrower 21 is equipped with a rectangularly shaped reinforcing structural member 52 at its forward end for substantially adjacent positioning to the discharge end of the bale forming chamber 20. Fastened to the reinforcing rectangular shaped ring 52 is a first sleeve or socket member 53 at the top thereof, and at the bottom a sleeve or socket 54 is provided. These sockets 53 and 54 are similarly in vertical axial alignment and the socket 53 is adapted to be mounted directly over the socket 48 supported by the bale forming chamber 20 whereas the socket 54 is arranged to lie immediately beneath the socket 49 on the bale forming chamber 20. Removable pins 55 and 56 pass respectively through the aligned sockets 53 and 48 and 49 and 54 whereby the bale thrower 21 has pivotal capabilities about the vertically aligned pins 55 and 56 is a vertical hinge. The reinforcing ring 52 on the bale thrower 21 is sufficiently large to permit swinging around the relatively smaller bale forming chamber 20. This, of course, avoids any binding of the bale thrower relative to the bale forming chamber when the thrower is directed at an angle with respect to a generally fore-and-aft line through the bale forming chamber 20.

Generally the bale thrower 21 includes spaced side sheets 57 and 58 which are joined by a cross top sheet 59 and a downwardly depending forward wall 60. The top 59 forms a shelf or support for an engine 61. The engine does not specifically form a part of the present invention other than to provide rotational drive for the plurality of bale projecting rollers to be subsequently described in detail. The engine 61 has a driven shaft 62 projecting out one end thereof and this shaft carries a flywheel 63 and a belt pulley. A plurality of spaced apart rollers are provided in generally aligned position forming an upward and rearward continuation of the top of the bale forming chamber 20. Similarly, a plurality of generally aligned rollers, spaced beneath the first set of rollers and forming an upward and rearward continuation of the lower or bottom of the bale forming chamber 20, constitute the means for ejecting the bales. The rollers are respectively mounted on shafts 71, 72, 73, 74, 75 and 76. The bale thrower of this invention includes a frame supporting structure generally designated by the numeral 77. This supporting structure is flanked at its forward end by the side sheets 57 and 58 and at the rearward and upward portions thereof the frame structure includes an upper portion 78 which comprises spaced apart angle members 79 and 80 which are joined at their upper and rearward ends by a cross angle member. Similarly, the lower portion of the thrower which is inclined upwardly and rearwardly includes a portion 82 of the frame structure 77 and this includes spaced apart angle members 83 and 84 which are joined at their outer ends by a cross angle member. It is on these subframe sections 78 and 82 that the rollers are journally mounted. The shafts 71, 72 and 73 for the upper set of rollers are carried in hanger bearings 86, 87 and 88 mounted on the undersides of both of the spaced apart members 79 and 80 of the upper subframe 78. Similarly, the lower set of rollers have their shafts 74, 75 and 76 carried in spaced apart pillow block bearings 89, 90 and 91 mounted on each of the side angle members 83 and 84 of the lower sub-frame 82.

As best shown in FIG. 2, each of the roller shafts 71 through 76 respectively carries a V-pulley 92, 93, 94, 95, 96 and 97. An idler pulley 98 is journally mounted for rotation on an arm 99 which is shown pivotally attached at 100 to the upper sub-assembly frame 78 at generally the rearward portion of the angle member 79. The V-pulley idler 98 is shown extended in the full line position of FIG. 2 and is shown retracted in dashed lines in FIG. 2.

As stated in the objects above, mechanism is provided for effecting a turning of the bale throwing device upon the pulling hay baler having relative angular position with respect to a bale receiving trailing wagon. This mechanism is shown in detail in FIGS. 3 and 4. FIG. 3 shows a generally channel shaped housing 133 which is hingedly mounted on an arm 134 affixed to the side and extending across and under the bale throwing mechanism. A forwardly extending arm member 135 is provided with a wagon tongue engaging member 136. It should be understood that this device 136 and the channel shaped housing 133 may be swung vertically about the shaft 134 as an axis so that when the channel member 133 and its projecting arm 135 is moved downwardly about the shaft 134, the tongue engaging mechanism 136 can flank the tongue in a manner to be subsequently described. The arm member 135 is equipped with a pivot 137 at its inner end and the pivot pin is equipped with a bracket member 138 to which is attached the forward end 139 of a coil spring 140. The rearward end of the spring 140 is adjustably anchored as at 141 to the other end of the channel member 133.

Figure 4:
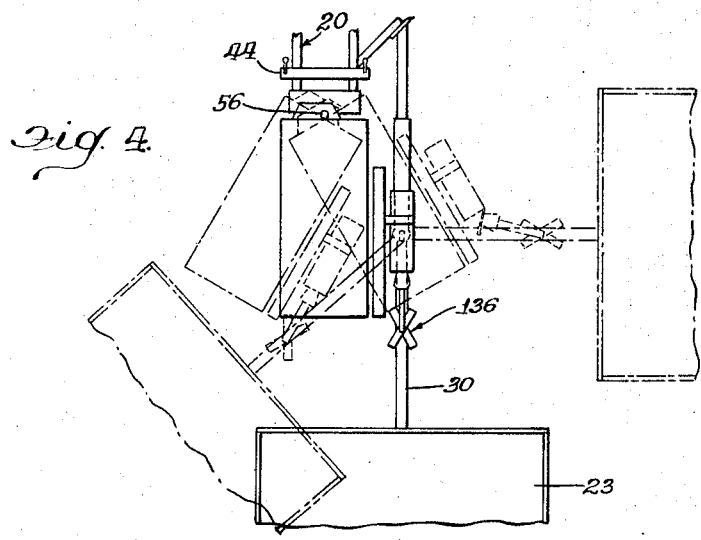
FIG. 4 is a top plan view of the rear of a baler with the thrower of this invention mounted thereon. The view of FIG. 4 may be considered to be taken on the line 4—4 of FIG. 1.

The channel 133 is provided with hook-like members 133a and 133b on opposite interior walls thereof adjacent the outer ends of the pivot pin 137. Small vertically disposed rod members 137a and 137b are weldably attached to the outer ends of the pivot pin 137. These end rods loosely engage the hook-like members 133a and 133b respectively. Movement of the pivot pin 137 within the channel member 133 is resisted by the spring 140. However, in instances of emergency the arm 135 can yield to the position as shown in dash lines in FIG. 3 where the end rod 137a acts as a hinge pin within the hook-like member 133a. Conversely the device may swing the other way with the end rod 137b acting as the hinge pin within the hook-like member 133b. Attention is now directed to FIG. 4 of the drawing which shows the forward end of the wagon box 23 and a forwardly projecting wagon tongue 30. The wagon 23 is positioned directly rearwardly of the bale discharging device in its full line position thereof, whereas, when the wagon has had relative movement, either right or left, the bale-throwing mechanism is moved to the dash-line position thereof, as shown in FIG. 4, following part way the movement of the trailing wagon. It should be noted that in the dashed-line position of the discharge mechanism and the trailing wagon on the left side of FIG. 4, the bales moving therethrough will be deposited in the trailing wagon while in the dashed-line position of the discharge mechanism on the right side of FIG. 4 there is shown an exaggerated relative movement of the wagon with respect to the pulling hay baler which is beyond the scope of the possible movement of the bale discharge mechanism. Thus, there is a limit means to the swingability of the bale throwing mechanism. This limit is accommodated by separation of the pivot pin 137 with respect to the tubular housing 133 as shown in either of the dashed-line positions of FIG. 3 or FIG. 4. It is impractical to have the bale throwing mechanism swing around greater than this angle of approximately 30° and hence the automatic release mechanism for separating the bale throwing mechanism from the wagon tongue such as shown in the dashed-line position of the wagon in the right side of FIG. 4 is desirable. The channel 133 is formed as a part of the bale throwing mechanism inasmuch as the shaft 134 is fixed to the bale throwing mechanism. However, the channel 133 does have rocking movement relative to the bale throwing mechanism so that the tongue engaging mechanism 136 can drop over the wagon tongue 30. The tongue engaging mechanism 136 includes crossed members 142 and 143 with a hinge pin 144 at the center thereof. At the outer extremity of each of the cross arms 142 and 143 are downwardly extending, roller-like sleeve covered pins 145, 146, 147 and 148. These pins, as shown in FIG. 1, are adapted to drop over and flank the sides of the wagon tongue 30. A bar member 136a having a plurality of adjustment holes 136b therein is used to adjust the width of spread of the member 136 to easily and freely engage any width of wagon tongue. Locking pins 146a and 148a are removably engaged with the lower ends of the pins 146 and 148 respectively to thus hold the bar 136a in fixed position on the cross member structure 136 in any set of desired holes 136b. The bar 136a also acts to lock the tongue engaging means to the wagon tongue during operation of the device of this invention. The width adjustment is made so that the pins 145, 146, 147, and 148 snugly flank the side of the tongue 30 to effect an immediate response to a swinging movement of the tongue through the arm 135 and tubular housing 133 whereby there is a similar and corresponding swinging movement of the entire bale throwing device. Thus there is a concurrent movement of the bale throwing mechanism with the turning of the wagon tongue 30 until the built-in limit is reached and the pivot pin 137 swings in a hinging fashion out from the channel 133 thereby causing a collapse of the arm 135 relative to the housing 133 and the result is the device as shown in dashed lines on the right half of FIG. 4.

In the operation of the device of this invention, the hay baler is drawn through a field of windrowed hay by a tractor, or the like, and a wagon is attached to the back of the bale forming chamber by means of a pin 31 and clevis 32. The bale throwing mechanism by reason of the serpentine V-belt 130 driven by the engine 61 causes the semi-pneumatic laminated rolls to engage bales being pushed therebetween and the bales are elevated at a relatively high rate of speed upwardly and rearwardly so that the bales are deposited in the large wagon box 24 of the trailing wagon 23. Variations in engine speed are utilized to vary the length of bale throw to fill the wagon box from front to rear. A throttle control 61a extends forwardly from the engine 61 to a position adjacent the operator's station on a pulling tractor. During angular movements of the hay baler relative to the trailing wagon, there are means provided for pulling the bale throwing mechanism about its hinge 56 until the limit of swingability is reached and thereafter the mechanism separates as shown in dashed lines in FIG. 3 and in FIG. 4. This, of course, causes a saving of most of the hay bales thrown inasmuch as the wagon box is usually directly behind the bale thrower until the angular relationship gets too great to be accommodated by this feature.

We are aware that many details of construction may be varied throughout a wide range without departing from the principles disclosed herein, and we, therefore, do not propose limiting the patent granted hereon otherwise than as necessitated by the appendant claims.

What is claimed is:

1. In a hay baler having a frame structure, a bale discharge device hingedly attached to said frame structure for horizontal swinging movement at the rear thereof, a trailing wagon, a tongue for said wagon, hitch means joining said tongue to said frame structure, said hitch means including hinge elements to permit lateral angular swinging of said tongue relative to said frame structure, a fixed support projecting laterally outwardly from said bale discharge device, connecting means hinged to said fixed support for up-and-down swinging movement, tongue engaging means on the end of said means whereby angular movements of the tongue are imparted to said bale discharge device through said means, and wherein said connecting means includes a downwardly opening channel, hook-like members on the interior walls of the spaced apart channel sides near one end of said channel, a pivot pin arranged to be positioned against said hook-like members, a spring attached to said pivot pin at one end and attached at its other end to the other end of said channel whereby the pivot pin is normally urged against said hook-like members, an arm fastened to said pivot pin at one end and attached at its other end to said tongue engaging means whereby during preliminary angular movement of the wagon tongue relative to the baler the means hinged to the support will swing therewith and during subsequent angular movement the pivot pin will be caused to hinge at one end thereof about the hook-like member on one side of the channel.

2. In a hay baler having a frame structure, a bale discharge device hingedly attached to said frame structure for horizontal swinging movement at the rear thereof, a trailing wagon, a tongue for said wagon, hitch means joining said tongue to said frame structure, said hitch means including hinge elements to permit lateral angular swinging of said tongue relative to said frame structure, a fixed support projecting laterally outwardly from said bale discharge device, connecting means hinged to said fixed support for up-and-down swinging movement, tongue engaging means on the end of said means whereby angular movements of the tongue are imparted to said bale discharge device through said means, and wherein said tongue engaging means includes crossed arms and downwardly extending pins from the ends of each of said arms, and a connecting bar removably attached to the bottoms of one pin from each of the crossed arms.

3. A device as set forth in claim 2 in which the connecting bar is equipped with a plurality of holes therealong to provide adjustment of the spacing of the downwardly extending pins of the crossed arms.

References Cited

UNITED STATES PATENTS

| | | | |
|---|---|---|---|
| 2,491,353 | 12/1949 | Acton | 214—42 |
| 2,778,510 | 1/1957 | Mayhill et al. | |
| 2,807,378 | 9/1957 | Currie. | |
| 2,864,517 | 12/1958 | Dickenshied. | |
| 2,894,651 | 7/1959 | Forth et al. | 214—83.3 |
| 3,055,519 | 9/1962 | Hollyday. | |

GERALD M. FORLENZA, *Primary Examiner.*

A. J. MAKAY, *Assistant Examiner.*